US010725190B2

United States Patent
Gratacos et al.

(10) Patent No.: US 10,725,190 B2
(45) Date of Patent: Jul. 28, 2020

(54) SEISMIC DATA PROCESSING USING MATCHING FILTER BASED COST FUNCTION OPTIMIZATION

(71) Applicant: CGG SERVICES SAS, Massy (FR)

(72) Inventors: Bruno Gratacos, Subiaco (AU);
Andrew Ratcliffe, Henfield (GB);
Gilles Lambare, Saint Fargeau Ponthierry (FR); Graham Roberts, Forest Row (GB); Lian Duan, Crawley (GB)

(73) Assignee: CGG SERVICES SAS, Massy (FR)

( * ) Notice: Subject to any disclaimer, the term of this patent is extended or adjusted under 35 U.S.C. 154(b) by 294 days.

(21) Appl. No.: 15/318,139

(22) PCT Filed: Jun. 29, 2015

(86) PCT No.: PCT/IB2015/001257
§ 371 (c)(1),
(2) Date: Dec. 12, 2016

(87) PCT Pub. No.: WO2016/001750
PCT Pub. Date: Jan. 7, 2016

(65) Prior Publication Data
US 2017/0115418 A1    Apr. 27, 2017

Related U.S. Application Data

(60) Provisional application No. 62/028,326, filed on Jul. 24, 2014, provisional application No. 62/027,822, (Continued)

(51) Int. Cl.
G01V 1/36    (2006.01)
G01V 1/28    (2006.01)

(52) U.S. Cl.
CPC .............. *G01V 1/364* (2013.01); *G01V 1/282* (2013.01); *G01V 2210/51* (2013.01)

(58) Field of Classification Search
CPC .............................. G01V 1/364; G01V 1/282
(Continued)

(56) References Cited

U.S. PATENT DOCUMENTS

2010/0018718 A1    1/2010  Krebs
2011/0103187 A1    5/2011  Albertin et al.
(Continued)

FOREIGN PATENT DOCUMENTS

GB    2509223 A    6/2014

OTHER PUBLICATIONS

International Search Report in related International Application No. PCT/IB2015/001257, dated Feb. 1, 2016.
(Continued)

*Primary Examiner* — Ricky Ngon
(74) *Attorney, Agent, or Firm* — Patent Portfolio Builders PLLC (57) ABSTRACT

A method for processing seismic data from a subsurface using least squares migration or wave equation migration velocity analysis over a cost function comprising a function of a matching filter by iteratively updating the reflectivity model velocity model to yield an updated reflectivity model or updated velocity model that matches the observed seismic data.

20 Claims, 4 Drawing Sheets

Related U.S. Application Data filed on Jul. 23, 2014, provisional application No. 62/018,682, filed on Jun. 30, 2014.

(58) Field of Classification Search
USPC .......................................................... 702/17
See application file for complete search history.

(56) References Cited

U.S. PATENT DOCUMENTS

| | | | |
|---|---|---|---|
| 2012/0059633 A1 | 3/2012 | Dutta et al. | |
| 2013/0028052 A1* | 1/2013 | Routh | G01V 1/28 367/43 |
| 2013/0308420 A1* | 11/2013 | Soubaras | G01V 1/282 367/7 |
| 2014/0039799 A1* | 2/2014 | Krohn | G01V 1/306 702/14 |
| 2014/0121981 A1* | 5/2014 | Synnevaag | G01V 1/364 702/17 |
| 2014/0133275 A1* | 5/2014 | Guan | G01V 1/301 367/53 |
| 2014/0149046 A1* | 5/2014 | Baina | G01V 1/282 702/14 |

OTHER PUBLICATIONS

Written Opinion of the International Searching Authority in related International Application No. PCT/IB2015/001257, dated Feb. 1, 2016.
J.F. Claerbout, "Earth Soundings Analysis: Processing Versus Inversion", Mar. 23, 2004, Stanford University.
W. Dai et al., "Least-Squares Migration of Multisource Data with a Deblurring Filter", Geophysics, Sep.-Oct. 2011, vol. 76, No. 5, pp. R125-R146.
S. Dong et al., "Least-Squares Reverse Time Migration: Towards True Amplitude Imaging and Improving the Resolution", SEG Technical Program Expanded Abstracts, Sep. 2012, pp. 1-5.
S. Dong et al., "Practical Aspects of Least-Squares Reverse Time Migration", 75th EAGE Conference & Exhibition Incorporating SPE EUROPEC 2013, London, UK, Jun. 10-13, 2013.
B. Gratacos et al., "Amplitude Effects Associated with Shear-Wave Splitting", SEG International Exposition and Annual Meeting, Houston, Texas, SEG Technical Program Expanded Abstracts, 2009, pp. 4284-4288.
L. Guasch et al., "Adaptive Waveform Inversion—FWI Without Cycle Skipping—Applications", 76th EAGE Conference & Exhibition 2014, Amsterdam RAI, The Netherlands, Jun. 16-19, 2014.
S. Jin et al., "Nonlinear Velocity Inversion by a Two-Step Monte Carlo Method", Geophysics, Apr. 1994, vol. 59, No. 4, pp. 577-590.
T. Nemeth et al., "Least-Squares Migration of Incomplete Reflection Data", Geophysics, Jan.-Feb. 1999, vol. 64, No. 1, pp. 208-221.
G.T. Schuster, "Least-Squares Cross-Well Migration", SEG 63rd Annual Meeting, SEG Technical Program Expanded Abstracts, 1993, pp. 110-113.
R. Soubaras et al., "Velocity Model Building by Semblance Maximization of Modulated-Shot Gathers", Geophysics, Sep.-Oct. 2007, vol. 72, No. 5, pp. U67-U73.
W.W. Symes, "A Differential Semblance Criterion", Department of Computational and Applied Mathematics, May 1992, pp. 1-51.
W.W. Symes et al., "Inversion of Reflection Seismograms by Differential Semblance Analysis: Algorithm Structure and Synthetic Examples", Geophysical Prospecting, 1994, vol. 42, pp. 565-614.
W.W. Symes et al., "Velocity Inversion by Differential Semblance Optimization", Geophysics, May 1991, vol. 56, No. 5, pp. 654-663.
M. Warner et al., "Adaptive Waveform Inversion—FWI Without Cycle Skipping—Theory", 76th EAGE Conference & Exhibition 2014, Amsterdam RAI, The Netherlands, Jun. 16-19, 2014.
M.J. Woodward et al., "A Decade of Tomography", Geophysics, Sep.-Oct. 2008, vol. 73, No. 5, pp. VE5-VE11.
G. Yao et al, "Least-Squares Reverse-Time Migration", SEG Annual Meeting, Las Vegas, Nevada, SEG Technical Program Expanded Abstracts, 2012, pp. 1-5.
Y. Zhang et al., "A Stable and Practical Implementation of Least-Squares Reverse Time Migration", SEG International Exposition and Annual Meeting, Houston, Texas, SEG Technical Program Expanded Abstracts, 2013, pp. 3716-3720.
Chauris, H., et al.; "Two-dimensional velocity macro model estimation from seismic reflection data by local differential semblance optimization: applications to synthetic and real data sets"; Geophysical Journal International, vol. 144; Jan. 2001; pp. 14-26.

* cited by examiner

SEISMIC DATA PROCESSING USING MATCHING FILTER BASED COST FUNCTION OPTIMIZATION

CROSS REFERENCE TO RELATED APPLICATIONS

This application claims priority and benefit from U.S. Provisional Patent Application Nos. 62/018,682, filed Jun. 30, 2014, for "Estimation of Time Difference Between 2 Sets of Traces", 62/027,822, filed Jul. 23, 2014 for "Method for Least Squares Migration" and 62/028,326, filed Jul. 24, 2014 for "Method for Wave Equation Migration Velocity Analysis", the entire contents of which are incorporated herein by reference.

TECHNICAL FIELD

Embodiments of the subject matter disclosed herein generally relate to methods and systems for determining geophysical properties of subsurface structures, more particularly, to the processing of recorded seismic data to generate geophysical properties of the subsurface structure.

BACKGROUND

Seismic surveys of subsurface regions of the Earth generate seismic data sets that are analyzed to determine the geophysical properties of the subsurface regions. Inversion processes can be used to match models of the geophysical properties of the subsurface regions with the actually observed and recorded seismic data. These inversion processes include least squares migration and wave equation migration velocity analysis. These inversion processes attempt to match models of the subsurface region of interest with actual recorded seismic data from the same subsurface region through the maximization or minimization of a given cost function. These costs functions can have a connection with the estimation of the lag between seismic traces (in time, depth or any other spatial parameter). Therefore, the definition of the cost functions and accounting for this lag between the seismic traces are important in using recorded seismic data to determine the geophysical properties of a subsurface region of interest.

Regarding time lags between seismic traces, analysis of seismic surveys of a subsurface region of interest can generate two distinct datasets differing by a time difference, time lag or time shift. This time shift can be estimated by determining the location of the maximum of the cross-correlation between the two datasets over a certain window in time, possibly averaged across several traces. However, this approach does not define the time difference as a continuous function of the data samples, which is a desirable property for optimisation or when the stability of the estimate is a concern, e.g., two very similar maxima would not lead to estimates that jump from one to the other if even a tiny amount of noise is added. In addition, if the first dataset and the second dataset have a constant phase difference, e.g. two different acquisition methods having a π/2 phase difference, the maximum of the cross-correlation yields an incorrect answer as more zero-crossing points exist that indicate the time shift. Therefore, improved methods for estimating this time difference that can be used in formulating cost functions is desired.

With regard to the use of least squares migration (LSM), the classic papers are "Least-squares Crosswell Migration" by Schuster (1993) and "Least-squares Migration of Incomplete Reflection Data" by Nemeth et al. (1999). They first introduced the concept and applied it to cross-well and surface seismic data, respectively. LSM is a very computationally expensive process, which is seen in its evolution in the literature from using a Kirchhoff migration (Nemeth et al., 1999) to the more expensive but exact Reverse Time Migration (RTM) algorithm that uses the two-way wave equation ("Least-squares Migration of Multisource Data with a Deblurring Filter" by Dai et al., 2011). Some of the literature covers conventional amplitude matching LSM ("Least-squares Reverse-Time Migration" by Yao et al., 2012 and "Least-squares Reverse Time Migration: Towards True Amplitude Imaging and Improving the Resolution" by Dong et al., 2012), while others have adopted cross-correlative methods to overcome the more practical problems in the method associated with the application to real data ("A Stable and Practical Implementation of the Least-Squares Reverse Time Migration" by Zhang et al., 2013). Also, in "Practical aspects of Least-squares Reverse Time Migration" by Dong et al. (2013) using a matching filter to help with the practical problems in a LSM algorithm is addressed while the standard cost function based on the difference between the modeled data and the observed data in their LSM process is used.

Wave equation migration velocity analysis is a highly non-linear process. Hence having a more convex cost function is an important issue. This type of cost function has some connection with the estimation of lag in depth between traces. As such it makes bridges with classical migration velocity analysis where picked residual move out are used ("A Decade of Tomography" by Woodward et al., 2008), but with the benefit of not being based on picking and rays.

In general, the sinusoidal nature of seismic data means that any cost function based on the difference between observed and modeled traces can suffer from cycle skipping, causing many additional local minima to be formed in the cost function. The existence of many local minima in a cost function leads to complications in obtaining the global minima. Therefore, methods of using LSM and wave equation migration velocity analysis that avoid the problems of cycle skipping and provide a global minimum or maximum are desired. These methods could utilize cost functions that account for time lags between traces in recorded seismic data.

SUMMARY

Exemplary embodiments are directed to systems and methods that process seismic data from a subsurface by using least squares migration over a cost function that is a function of a matching filter containing a mapping between the observed seismic data and the modeled seismic data by iteratively updating the reflectivity model to yield an updated reflectivity model that when forward modeled yields updated modeled seismic data that match the observed seismic data. Exemplary embodiments are also directed to systems and methods that process seismic data from a subsurface by using wave equation migration velocity analysis over a cost function that is a function of a matching filter containing a mapping between a reference trace at a given depth below the subsurface and a considered trace in the common image gather by iteratively updating the velocity model to yield an updated velocity model corresponding to a desired flatness in the common image gather as indicated by the cost function.

In one exemplary embodiment, a method for processing seismic data from a subsurface includes obtaining observed seismic data of the subsurface and generating a reflectivity model of the subsurface. The reflectivity model yields modeled seismic data of the subsurface when forward modeled. In one embodiment, generating the reflectivity model includes generating the reflectivity model comprising a stacked reverse time migration image.

Least squares migration is used over a cost function containing a function of a matching filter containing a mapping between the observed seismic data and the modeled seismic data by iteratively updating the reflectivity model to yield an updated reflectivity model that when forward modeled yields updated modeled seismic data that match the observed seismic data. Suitable matching filters include a Wiener filter. In one embodiment, using least squares migration includes defining the matching filter to map at least one of the observed seismic data to the modeled seismic data and the modeled seismic data to the observed seismic data and defining the cost function over the reflectivity model as a function of the matching filter. In addition, the reflectivity model is updated to drive the matching filter to a unit spike at zero lag.

In one embodiment, the cost function is a ratio of a least squares norm of the matching filter multiplied by a temporal lag and the least squares norm of the matching filter. In one embodiment, a plurality of matching filters is defined and least squares migration includes updating the reflectivity model to the plurality of matching filters to yield a unitary matching filter at zero lag. Using least squares migration further includes both maximizing the cost function and minimizing the cost function.

In one embodiment, at least one of the observed seismic data, the modeled seismic data and the reflectivity model is pre-processed, wherein pre-processing includes at least one of scaling, filtering, noise attenuation, event selection, smoothing and re-datuming. In one embodiment, the observed seismic data and the modeled seismic data are encoded by convolution with a set of encoding functions, and the encoding functions are updated for each iterative update of the reflectivity model.

Exemplary embodiments are also directed to a method for processing seismic data from a subsurface that includes computing common image gathers from the observed seismic data, estimating a velocity model, i.e., an initial velocity model, of the subsurface and using wave equation migration velocity analysis based on a cost function comprising a function of a matching filter containing a mapping between a reference trace at a given location and a considered trace in the common image gather by iteratively updating the velocity model to yield an updated velocity model corresponding to a desired flatness in the common image gather as indicated by the cost function. Suitable matching filters include Wiener filters. In one embodiment, the matching filter is varied according to recording time in the observed seismic data.

In one embodiment, the reference trace is a stack of common image gather over a given parameter or a given trace selected from the common image gather. In one embodiment, using wave equation migration velocity analysis includes defining the matching filter to map at least one of the reference trace to the considered trace and the considered trace to the reference trace and defining the cost function over the velocity model as a function of the matching filter. In one embodiment, the cost function is a weight function over all receiver locations and all parameters used to define the common image gather and the matching filter normalized to a given exponent and summed across all depths. In one embodiment, using wave equation migration velocity analysis includes updating the velocity model to drive the matching filter to a unit spike at zero lag.

In one embodiment, a plurality of matching filters is defined, and wave equation migration velocity analysis includes updating the velocity model to the plurality of matching filters to a unitary matching filter at zero lag. Using wave equation migration velocity analysis includes both maximizing the cost function and minimizing the cost function.

Exemplary embodiments are also directed to a method for processing seismic data from a subsurface that includes identifying two traces from observed seismic data of the subsurface, obtaining a cross-correlation for the two traces and using the cross-correlation to determine a time shift between the two traces by estimating a center of cross-correlation by identifying the time shift between the two traces that minimizes a weighted integral with respect to frequency of the derivative of the phase squared of the time-shifted cross-correlation. The weighted integral permits calculations to be conducted entirely in a time domain.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In accordance with one exemplary embodiment, least squares migration (LSM) is utilized, which enhances the resolution of, and removes acquisition footprints and other migration artifacts in, seismic imaging. In the reverse time migration (RTM) version of LSM, which can be referred to as LSRTM, the reflectivity model is generally a stacked RTM image. In this case the effects of the kinematic (velocity) errors are usually small for the near offsets. But for the far offsets these errors could cause events to be poorly aligned between modeled and observed data, leading to cycle skipping when a difference is formed. This problem is exacerbated in areas containing complex geological structures. Also, the free-surface ghost effects in the observed seismic data are directional and vary from trace to trace and as a function of emergence or arrival angle. Exemplary embodiments overcome both of these issues by not forming the difference between the modeled and observed data and instead minimizing an objective function, or cost function, based on matching filters between the modeled and observed data of the subsurface area.

In general, LSM defines the seismic imaging problem as a least squares inversion problem. A reflectivity model, which in one embodiment is a stacked RTM image, of the subsurface is generated that, when de-migrated or forward modeled, yields modeled seismic data that best match the observed or recorded seismic data obtained from the subsurface in a least squares sense. Typically, "least squares sense" refers to minimizing a cost function using the LSM technique where the cost function is the difference between the modeled data and the observed data. In accordance with this exemplary embodiment, a different cost function is used. At least one matching filter, and alternatively a set of matching filters is defined to map the observed data onto the modeled data (or vice-versa), and the reflectivity model is updated iteratively to drive the matching filters towards a simple unitary filter at zero-lag, or in one embodiment towards any filter that leaves a given dataset effectively unchanged, except for the overall amplitude level if that is different in the two datasets. This ensures agreement between observed and modeled, or predicted, seismic data.

In the LSM inversion when considering the Born approximation to the linearized wave equation for a known velocity model, the synthetic data modeled at a given receiver location from a given source location can be written in matrix form as:

$$d = Lm \quad (1)$$

where d is the modeled or scattered data, m is the reflectivity model of the subsurface of the earth and L is the forward modeling operator, i.e., linear, Born.

The migration operator is the adjoint of this forward modeling operator and can be represented by:

$$m_{mig} = L^T d \quad (2)$$

where $m_{mig}$ is the migrated image and $L^T$ is the migration operator. An imaging problem arises because migration is the adjoint, not the inverse, of the forward modeling operator. This is clearly seen when substituting equation (1) into equation (2) to give:

$$m_{mig} = L^T L m$$

which only gives the desired $m_{mig} = m$ when $L^T L = 1$, and which, in general, is not the case.

LSM addresses this problem by casting the imaging problem as an optimization problem where the difference between the modeled and observed data ($d_0$) is minimized in a least squares sense:

$$E(m) = \|Lm - d_0\|^2$$

where E(m) is the cost function to be minimized, and $\|\ldots\|^2$ corresponds to the conventional L2, least squares, norm. This process would also work with other norms, for example, L1 and Cauchy, among others.

The cost function is commonly minimized via an iterative approach:

$$m_{k+1} = m_k - \alpha L^T [Lm_k - d_0]$$

where $\alpha$ is an appropriate step length, k is the iteration number and $m_k$ corresponds to the reflectivity image at iteration k. Other solvers could also be used to minimize this cost function, for example, conjugate gradient, Newton and Gauss-Newton, among others. Global solvers can also be used. To assist the LSM process, both the modeled and the observed dataset can be pre-processed, e.g., by scaling, filtering, noise attenuation and event selection, within the LSM:

$$m_{k+1} = m_k - \alpha L^T [p_{mod}(Lm_k) - p_{obs} d_0]$$

where $p_{mod}$ and $p_{obs}$ are the pre-processing operations on the modeled and observed data, respectively. This above approach can be referred to as LSM in the data domain, because the least squares are formed in the data domain. The difference between the modeled and observed data is repeatedly projected into the model domain to adjust the reflectivity image.

In accordance with the exemplary embodiment, this conventional least squares approach that uses a cost function based on the difference between the modeled and observed data is replaced with a two-stage process. In the first stage, a matching filter is generated to map the modeled data onto the observed data. Alternatively, the matching filter is generated to map the observed data onto the modeled data. In one embodiment, the matching filter is a Wiener filter. In one embodiment, the matching filter maps between the modeled and observed data on a trace by trace basis. In one embodiment, sparseness is included when deriving the matching filter.

In the second stage, a cost function with respect to the reflectivity model or image is minimized, or maximized, using iterative updates to the reflectivity model or image in order to drive matching filters towards simple unit spikes at zero-lag. If the matching filters are unit spikes, then the modeled data and the observed data are identical. Therefore, a reflectivity image is produced that when subject to a forward modeling operator yields a modeled seismic dataset that agrees exactly with the observed seismic data. In one embodiment, the unit spike target of the matching filters is replaced with any filter that leaves a given dataset effectively unchanged, except for the overall amplitude level if that is different in the two datasets. In one embodiment all of the seismic data are used in this LSM process. Alternatively, only a subset of the data is used in the LSM process, for example, through simple muting or decimation, or formal wavefield separation.

Figure 1:
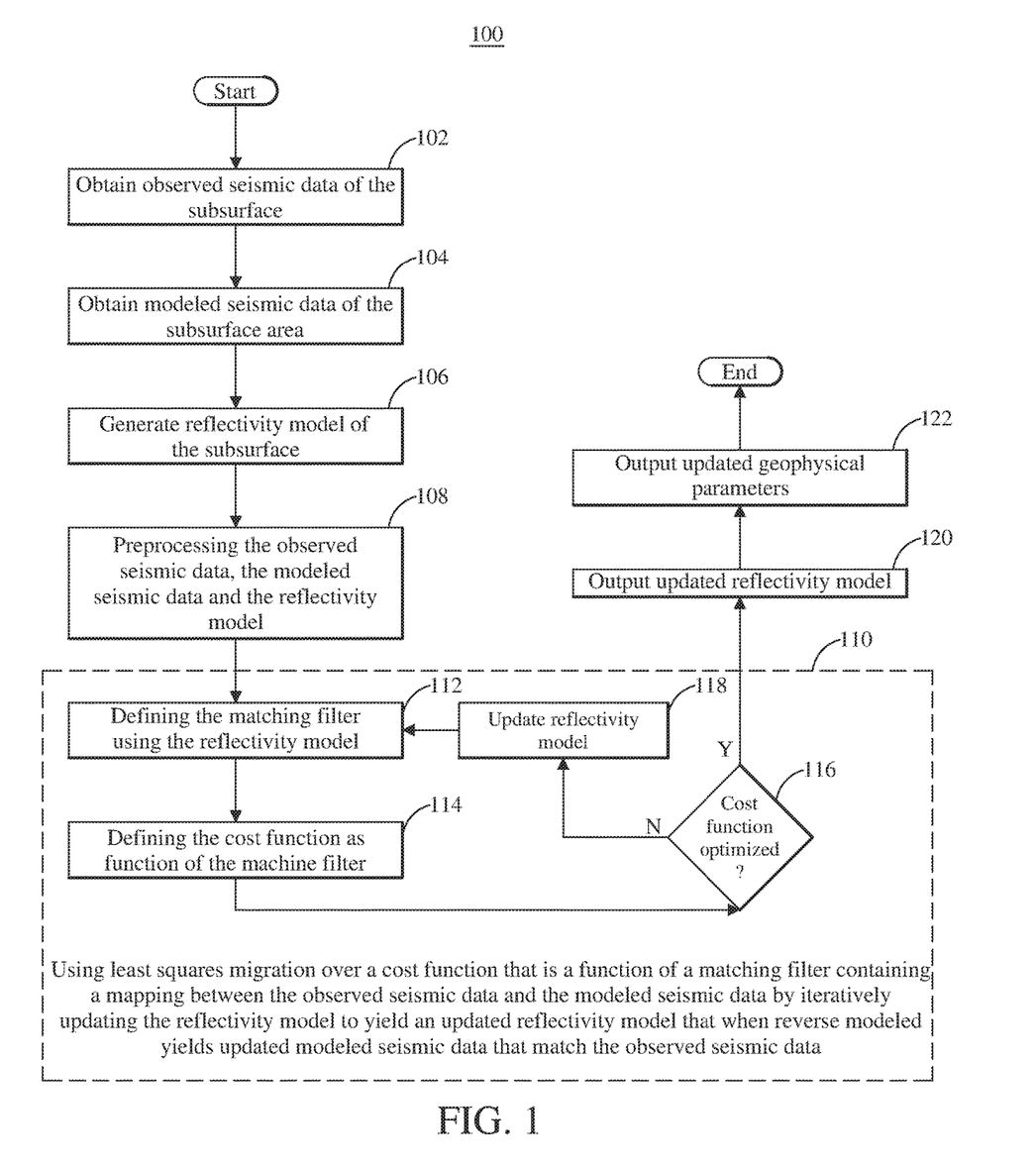
FIG. 1 is a flowchart of an embodiment of a method for processing seismic data from a subsurface.

Referring to FIG. 1, an exemplary embodiment of a method for processing seismic data from a subsurface 100 is illustrated. Initially, observed seismic data of the subsurface for which the geophysical properties are desired are obtained 102. Any suitable method for obtaining the seismic data that is known and available in the art can be used. Modeled seismic data of the subsurface area for which the geophysical properties are desired are generated 104. A reflectivity model of the subsurface is generated 106. This reflectivity model yields the modeled seismic data of the subsurface when forward modeled as illustrated, for example, by equation (1). Suitable reflectivity models include, but are not limited to, a stacked reverse time migration image. In one embodiment, at least one of the observed seismic data, the modeled seismic data and the reflectivity model are pre-processed 108. Suitable pre-processing includes, but is not limited to, scaling, filtering, noise attenuation, event selection, smoothing and re-datuming. In one embodiment, any form of pre-processing is applied either prior to, or directly in, the LSM method. In general, any pre-processing can be applied in the observed seismic data, the modeled seismic data, the reflectivity image, the data used to construct the matching filter and the matching filters.

Least squares migration is used with a cost function that is a function of a matching filter containing a mapping between the observed seismic data and the modeled seismic data by iteratively updating the reflectivity model to yield an updated reflectivity model that when forward modeled yields updated modeled seismic data that match the observed seismic data 110. Therefore, the matching filter is defined to map at least one of the observed seismic data to the modeled seismic data and the modeled seismic data to the observed seismic data 112. Alternatively, a plurality of matching filters is defined. Suitable matching filters include, but are not limited to, a Wiener filter.

The cost function is defined over the reflectivity model as a function of the matching filter 114. In one embodiment, the cost function is a ratio of a least squares norm of the matching filter multiplied by a temporal lag and the least squares norm of the matching filter:

$$F(m) = \|\text{temporal lag} \times \text{matching filter}\|^2 / \|\text{matching filter}\|^2$$

Using least squares migration involves optimizing the defined cost function. This includes maximizing the cost function or minimizing the cost function. Therefore, a determination is made regarding whether the cost function is optimized 116. If the cost function is not optimized, then the reflectivity model is updated 118, which updates the matching filter and the cost function that is defined in terms of this matching filter. When a plurality of matching filters has been defined, updating the reflectivity model updates the plurality of matching filters. Similar to the conventional LSM process, this minimization process proceeds iteratively to obtain the desired minima or maxima for the cost function. In one embodiment, updating the reflectivity model drives the matching filter to a unit spike or unit value at zero lag. Therefore, the matching filter is a zero effect filter and the modeled seismic data match the observed seismic data. For a plurality of matching filters, updating the reflectivity models yields a unitary matching filter at zero lag.

In one embodiment, the matching filter varies in accordance with recording time down the trace, rather than just being a single matching filter for each shot and receiver trace, i.e. a windowed approach. In one embodiment, a hybrid approach creates the matching filter to "part-match" the observed data to the modeled data and "part-match" the modeled data to the observed data. The overall effect is the same as if a full match had been done in either domain. In one embodiment, the matching filters are created or applied over different dimensions (1D, 2D, 3D, etc.) or in different domains, e.g., temporal, frequency and curvelet, among others.

When a sufficient number of iterations have been conducted and a determination is made that the cost function has been optimized, then the updated reflectivity model is outputted 120. The updated geophysical parameters from the updated reflectivity model of the subsurface are then outputted 122. These geophysical parameters are used to analyze the subsurface for the location of desired subsurface formations and the location of oil and gas reservoirs.

In one embodiment of the exemplary LSM process using a cost function based on the matching filter, the observed and modeled data are encoded by convolution with a set of encoding functions. These encoding functions are applied in the field or in the computer. In one embodiment, the encoding functions are altered for each iteration of the LSM process, i.e., after each update to the reflectivity model.

In one embodiment of the exemplary LSM process, a simultaneous shooting arrangement is used to acquire the observed seismic data, and the data are de-blended as part of the LSM process. In one embodiment, multiples are generated in the modeling and included in the LSM process. In addition, at least one of ghost effects and compensation is included in the LSM process. In one embodiment, the LSM process includes de-signature. In one embodiment, the cost function varies the underlying velocity model at the same time as optimizing the reflectivity image in order to minimize the new cost function. Exemplary embodiments using the two stage LSM method with the cost function based on the matching filter produce a superior LSM result and derive global maxima or minima in the misfit between observed and modeled seismic data.

In one embodiment, a different norm other than the standard L2 norm is used in the new cost function, for example, L1 or Cauchy. In one embodiment, different forms of the wave equation are used, for example, acoustic, elastic, including attenuation and anisotropy. In addition, different ways to solve the wave equation can be used, for example, finite differences and finite elements. Other suitable migration algorithms include Kirchhoff, Beam and RTM.

Another exemplary embodiment is directed to a system, including a computing system for processing seismic data from a subsurface. The computing system includes a processor, data storage devices and input and output mechanisms sufficient to obtain observed seismic data of the subsurface and generating a reflectivity model of the subsurface.

The processor accesses the observed and the generated reflectivity model to perform least squares migration over a cost function containing a function of a matching filter containing a mapping between the observed seismic data and the modeled seismic data by iteratively updating the reflectivity model to yield an updated reflectivity model that when forward modeled yields updated modeled seismic data that match the observed seismic data. Suitable matching filters include a Wiener filter. The processor further uses least squares migration to maximize the cost function or to minimize the cost function.

The processor pre-processes at least one of the observed seismic data, the modeled seismic data and the reflectivity model by executing scaling, filtering, noise attenuation, event selection, smoothing and re-datuming processes. The processor encodes the observed seismic data and the modeled seismic data by convolution with a set of encoding functions stored in the computing system and executed by the processor. In one embodiment, the encoding functions are updated by the computing system for each iterative update of the reflectivity model.

In another exemplary embodiment, wave equation migration velocity analysis is used. Wave equation migration velocity analysis updates velocity models by flattening common image gathers obtained from pre-stack migration. In accordance with an exemplary embodiment, a cost function is used for assessing the flatness of the common image gathers. A two part method is used in which a set of matching filters is computed to map a reference trace in the common image gather into the considered trace. Alternatively, the set of matching filters maps the considered trace into the reference trace in the common image gather. In the second part, a cost function is defined using the matching filters, and the velocity model is updated to drive these matching filters towards a simple unitary filter at zero-lag in depth. This ensures agreement between the various traces of the common image gather. In one embodiment, the goal of obtaining matching filters that are simple unitary filters at zero-lag in depth is replaced with the goal of obtaining matching filters that leave a given dataset effectively unchanged, except for the overall amplitude level if that is different in the two datasets.

In pre-stack migration common image gathers are obtained by splitting contributions into subsets defined by parameter $\alpha$ (offset, angle, shot, receiver, etc.).

At a given location at the surface, x, the subsets are expressed as:

$$I_m(x,z,\alpha)$$

where z is the depth. Various criteria have been proposed to assess the quality of the velocity model through the flatness of gathers. The assumption is that common image gathers should be flat along $\alpha$ when the velocity model is correct. For example the cost function:

$$C(m)=\Sigma_x\Sigma_z a(x,z)\|\Sigma_\alpha I_m(x,z,\alpha)\|^n$$

where a(x, z) is some appropriate normalization and n is the exponent of the norm, can be proposed and maximized to find the best velocity. This type of cost function is a semblance type cost function when n=2. While it is well suited for estimating the optimum focusing when starting close by, local optimization may lead to secondary minima when starting far away.

Figure 2:
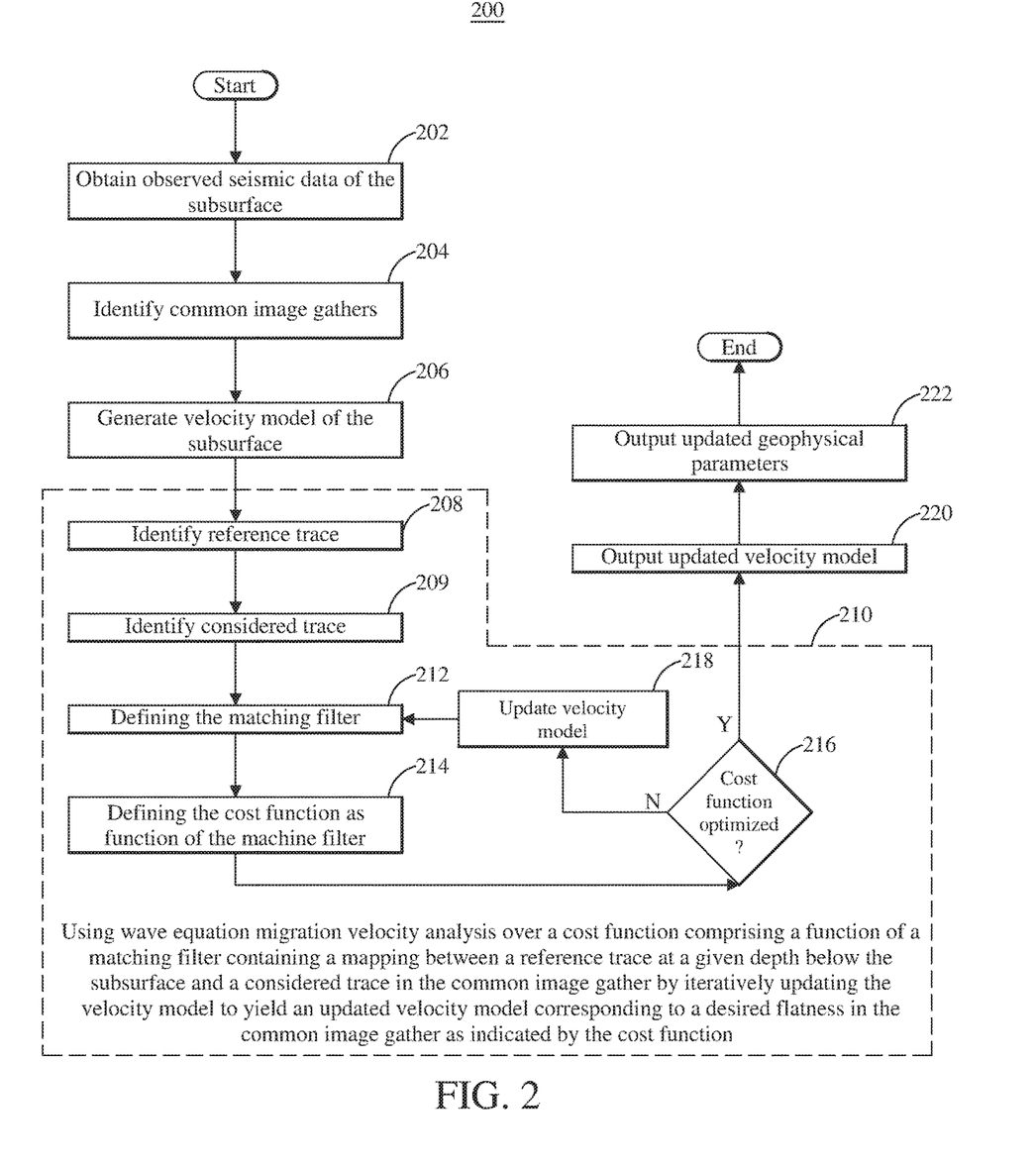
FIG. 2 is a flowchart of another embodiment of a method for processing seismic data from a subsurface.

Referring to FIG. 2, another exemplary embodiment of method for processing seismic data from a subsurface 200 is illustrated. Initially, observed seismic data of the subsurface for which the geophysical properties are desired are obtained 202. Any suitable method for obtaining the seismic data that is known and available in the art can be used. A common image gather from the observed seismic data is identified 204 based on one or more parameters. In one embodiment, a plurality of common image gathers is identified, each associated with a different parameter or set of parameters. In addition, an initial velocity model of the subsurface is generated 206.

Wave equation migration velocity analysis is used with a cost function comprising a function of a matching filter containing a mapping between a reference migrated trace at a given location at surface and a considered migrated trace in the common image gather by iteratively updating the velocity model to yield an updated velocity model corresponding to a desired flatness in the common image gather as indicated by the cost function 210.

In one embodiment of using wave migration velocity analysis, a reference trace is identified 208 and a considered trace in the common image gather is identified 209. Suitable reference traces include, but at not limited to a stack of common image gather over a given parameter and a given trace selected from the common image gather. The matching filter is defined 212 to map at least one of the reference trace to the considered trace and the considered trace to the reference trace. In one embodiment, a plurality of matching filters is defined. In one embodiment, the matching filter is not varied according to recording time in the observed seismic data. Alternatively, the matching filter is varied according to recording time in the observed seismic data.

In one embodiment, the matching filter $F_m(x, z, \alpha)$ is generated to map the considered trace (x, z, $\alpha$) in the common image gather onto a reference trace (z). Alternatively, the matching filter maps the reference trace to the considered trace in the common image gather. Suitable matching filters include, but are not limited to, Wiener filters. In one embodiment, sparseness is included in the derivation of the matching filter. In one embodiment, a matching process or mapping using the matching filter is conducted on a trace by trace basis with the reference trace being typically the stack of common image gather over $\alpha$ or any trace selected among the considered common image gather.

A cost function over the velocity model is defined as a function of the matching filter 214. In one embodiment, the cost function is a weight function over all receiver locations and all parameters used to define the common image gather and the matching filter normalized to a given exponent and summed across all depths as given by:

$$C(m)=\Sigma_x\Sigma_\alpha b(x,\alpha)\Sigma_z\|zF_m(x,z,\alpha)\|^n$$

where b(x, $\alpha$) is an appropriate weight, for example (for n=2)

$$b(x,\alpha)=1/\Sigma_z\|F_m(x\,z,\alpha)\|^2.$$

The cost function sums the weight function over all surface locations and all parameters. In addition, the matching filter is summed across all depths. In one embodiment, the process can be done on sliding windows in depth. In this embodiment, the matching filter is allowed to vary according to recording time down the observed or recorded seismic data trace, rather than just being a single matching filter for each shot and receiver trace, i.e. a windowed approach.

Using wave equation migration velocity analysis involves optimizing the defined cost function of the velocity model. This includes maximizing the cost function or minimizing the cost function. Optimization is performed as an iterative process. Therefore, a determination is made regarding whether the cost function is optimized 216 for any given iteration. If the cost function is not optimized, then the velocity model is updated 218, which updates the matching filter and the cost function that is defined in terms of this matching filter. When a plurality of matching filters has been defined, updating the velocity model updates the plurality of matching filters. This optimization process proceeds iteratively to obtain the desired minima or maxima for the cost function. In one embodiment, updating the velocity model drives the matching filter to a unit spike at zero lag. For a plurality of matching filters, updating the reflectivity models yields a unitary matching filter at zero lag. This because if the matching filters were unit spikes then the reference and considered data would be identical, namely flat common image gathers are produced.

When a sufficient number of iterations have been conducted and a determination is made that the cost function has been optimized, then the updated velocity model is outputted 220. The updated geophysical parameters of the subsurface are then outputted 222. These geophysical parameters are used to analyze the subsurface for the location of desired subsurface formations and the location of oil and gas reservoirs.

Another exemplary embodiment is directed to a system, including a computing system for processing seismic data from a subsurface. The computing system includes a processor, data storage devices and input and output mechanisms to compute common image gathers from the observed seismic data, estimate a velocity model, i.e., an initial velocity model, of the subsurface and use wave equation migration velocity analysis based on a cost function that is a function of a matching filter containing a mapping between a reference trace at a given location and a considered trace in the common image gather by iteratively updating the velocity model to yield an updated velocity model corresponding to a desired flatness in the common image gather as indicated by the cost function.

In one embodiment, the processor is used to define matching filter to map at least one of the reference trace to the considered trace and the considered trace to the reference trace and to define the cost function over the velocity model as a function of the matching filter. The processor updates the velocity model to drive the matching filter to a unit spike at zero lag. The processor is used to define a plurality of matching filters and to update the velocity model to the plurality of matching filters to a unitary matching filter at zero lag. The processor further uses wave equation velocity analysis to maximize the cost function or to minimize the cost function.

Exemplary embodiments include a cost function that facilitates computing the lag between pre-stack migrated traces. This provides access to residual move out and dips. In one embodiment, an extension of ray based travel time tomography to wave equation based tomography is used to take advantage of the full tool box of ray based tomography. Therefore, the cost function is related to the estimation of lag in depth between traces, making a bridge with classical migration velocity analysis where picked residual and move out are used but with the benefit of not being based on picking and rays.

Instead of computing the cross-correlation between two traces and determining the maximum in this cross correlation, exemplary embodiments define the time shift as the center of the cross-correlation between the two traces. This cross-correlation is defined such that the derivative of the phase of the shifted cross-correlation is minimized. A weighting scheme is utilized such that the cross-correlation can be conducted entirely in the time domain. For example, the weighting scheme can include the inverse of the autocorrelation of one of the traces, which estimates a measure of the time shift of a matching filter between the two traces without using the matching filter.

Figure 3:
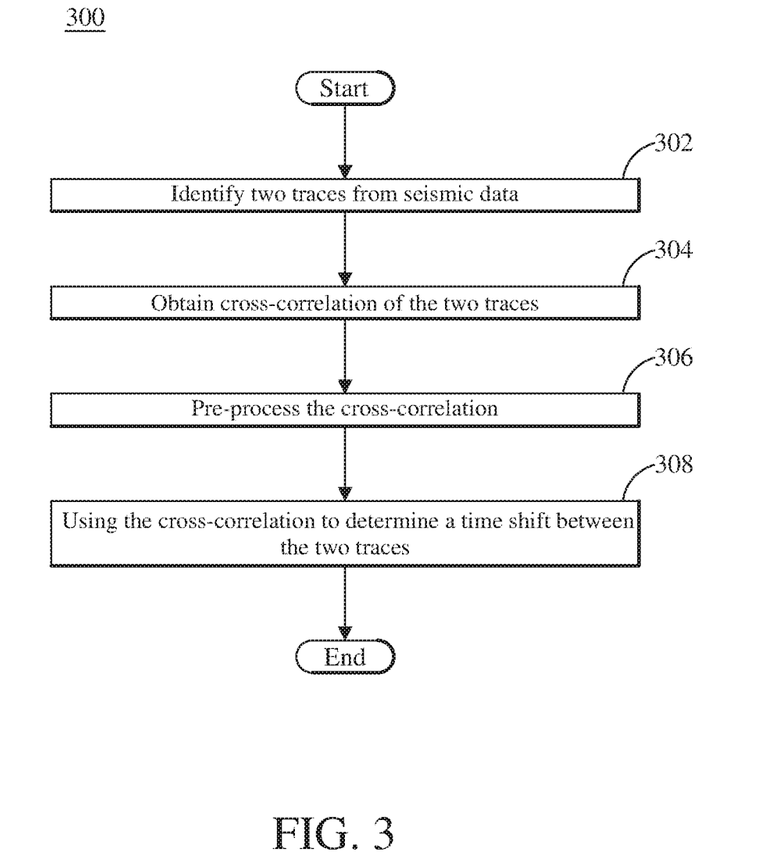
FIG. 3 is a flowchart of another embodiment of a method for processing seismic data from a subsurface.

Referring to FIG. 3, a one-dimensional application of this method for processing seismic data for a subsurface 300 is illustrated. Two traces are identified from seismic data 302. These traces can be obtained from any type of recorded seismic data including land-based surveys and seismic data obtained from streamers. A cross-correlation for the two identified traces is obtained 304. In one embodiment, this cross-correlation is pre-processed 306. Suitable pre-processing includes, but is not limited to, band-pass filtering or spectral shaping. A wavelet is defined as the cross-correlation of two traces, and the center of this wavelet is estimated. The cross-correlation or the wavelet is used to determine the time shift between the two traces 308. In particular, estimation of the center of the wavelet determines the time shift between those two traces. In one embodiment, the center of the wavelet is estimated by finding the time shift between the two traces that minimizes a weighted integral with respect to frequency of the derivative of the phase squared of the time-shifted wavelet. This definition of a center can be applied on any wavelet such as a matching operator between two traces instead of the cross-correlation. Suitable methods for the minimization of the weighted integral include, but are not limited to, numerical methods and algebraic methods. Suitable weighting permits the calculations to be conducted entirely in the time domain. In one embodiment, the weighted integral includes the inverse of the autocorrelation function of one of the two traces. Therefore, the center of the cross-correlation, i.e., the wavelet, is simply the time average weighted by the square of the samples.

In one embodiment, time lag or time shift between two traces is defined such that if applied to the cross-correlation the phase of the result has minimized variations over a certain bandwidth. This is the stationary phase condition. In order to define the time shift to achieve this result, the cross-correlation wavelet, $\mathcal{W}$, or any other wavelet, of samples $\mathcal{W}_k$ and spectrum $\mathcal{W}(f)$, whose phase over a given bandwidth $|f_0, f_1|$ is to be minimized by a time shift is defined. In other words, the phase of $\mathcal{W}_0(f) = e^{-2i\pi f \delta t_0} \mathcal{W}(f) \triangleq \rho(f) e^{i\Phi(f)}$ must be as stationary as possible. Therefore:

$$\mathcal{W}_0' \triangleq \frac{\partial \mathcal{W}_0(f)}{\partial f}$$
$$= (\rho' + i\phi' \rho) e^{i\phi}$$
$$= e^{-2i\pi f \delta t_0} (\mathcal{W}' - 2i\pi \delta t_0 \mathcal{W})$$

therefore, $\phi'$ can be isolated in a time-domain friendly form by:

$$\overline{\mathcal{W}_0} \mathcal{W}_0' - \mathcal{W}_0 \overline{\mathcal{W}_0'} = 2i\rho^2 \phi'$$
$$= -4i\pi \delta t_0 |\mathcal{W}|^2 + \overline{\mathcal{W}}\mathcal{W}' - \mathcal{W}\overline{\mathcal{W}'}$$
$$\triangleq -2i\pi d\Phi(f) (\text{i.e. } d\Phi \propto \rho^2 \phi')$$

Noting that $k\mathcal{W}_k$ are the samples, with an assumed sample rate of unity, of $$\frac{1}{2i\pi} \mathcal{W}',$$

with $d\mathcal{W}$ its spectrum, yields:

$$d\Phi = 2\delta t_0 |\mathcal{W}|^2 - \overline{\mathcal{W}} d\mathcal{W} + \mathcal{W} \overline{d\mathcal{W}}$$

Letting W(f) be a convenient weight function, the minimization of $E = \int_{f_1}^{f_2} W(f) |d\Phi(f)|^2 df$ with respect to $\delta t_0$ is an approximation of $\phi'(f) = 0$ over $[f_1, f_2]$. Therefore:

$$\frac{\partial \int_{f_1}^{f_2} W(f) |d\Phi(f)|^2 df}{\partial \delta t_0} = 0 \quad (3)$$
$$\Rightarrow 2\delta t_0 \int_{f_1}^{f_2} W|\mathcal{W}|^4 df = \int_{f_1}^{f_2} W|\mathcal{W}|^2 (\overline{\mathcal{W}} d\mathcal{W} - \mathcal{W} \overline{d\mathcal{W}}) df$$

In practice, $\mathcal{W}$ is band limited or can be band-pass filtered, and $[f_1, f_2]$ is taken as ±Nyquist. Using $$\int_{-\frac{1}{2}}^{\frac{1}{2}} e^{2i\pi n f} df = \frac{\sin(n\pi)}{n\pi} = \delta_0^n$$

the left hand side and the right hand side integrals of equation (3) reduce to the zero sample of the time version of their integrand. Choosing $W(f) = 1/|\mathcal{W}|^2$ yields the very simple solution:

$$\int_{-\frac{1}{2}}^{\frac{1}{2}} |W|^2 df = \sum_k w_k^2$$

$$(d'W * \overline{W})0 = \sum_k k w_k w - (0-k)$$

$$= \sum_k k w_k^2$$

$$\int_{-\frac{1}{2}}^{\frac{1}{2}} \overline{W} d'W - W \overline{d'W} f = 2 \sum_k k w_k^2$$

$$\text{hence } \delta t_0 = \frac{\sum_k k w_k^2}{\sum_k w_k^2}$$

Other choices for W are possible, and $\delta t_0$ is scaled by the sample rate, if it is not unitary.

While described for a one-dimensional application between two traces, in general, this exemplary method extends easily to multidimensional cross-correlation, thus allowing for finding dips in two dimensions (2D), three dimensions (3D), four or five dimensions (5D) (or even more) when the full wavefield is considered, i.e., for Green function $G(X_{s'}, Y_{s'}, X_{r'}, Y_{r'}, t)$ spaces. In addition, the time difference can be derived in a completely continuous way over the dataset, for example by using sliding windows. Suitable applications for this exemplary embodiment and generalizations of this exemplary embodiment include, but are not limited to, in the transition area for the estimation of static correction for different instruments types, in a four dimensional (4D) application to determine a base and repeat survey time difference, a demultiple application with data and multiple model, in multi component PP-PS warping, or PS1-PS2 measure of travel time difference, in full waveform inversion (FWD to measure the difference between data and modeled shots and in cable interpolation to provide a measure of cross-line slowness of events between streamers.

Another exemplary embodiment is directed to a system, including a computing system for processing seismic data from a subsurface. The computing system includes a processor, data storage devices and input and output mechanisms to identify two traces from observed seismic data of the subsurface, to obtain a cross-correlation for the two traces and to use the cross-correlation to determine a time shift between the two traces by estimating a center of cross-correlation by identifying the time shift between the two traces that minimize a weighted integral with respect to frequency of the derivative of the phase squared of the time-shifted cross-correlation. The weighted integral permits calculations to be conducted entirely in a time domain.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for processing seismic data from a subsurface in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read—only memory (ROM), a rigid magnetic disk and an optical disk. Suitable optical disks include, but are not limited to, a compact disk-read only memory (CD-ROM), a compact disk-read/write (CD-R/W) and DVD.

Figure 4:
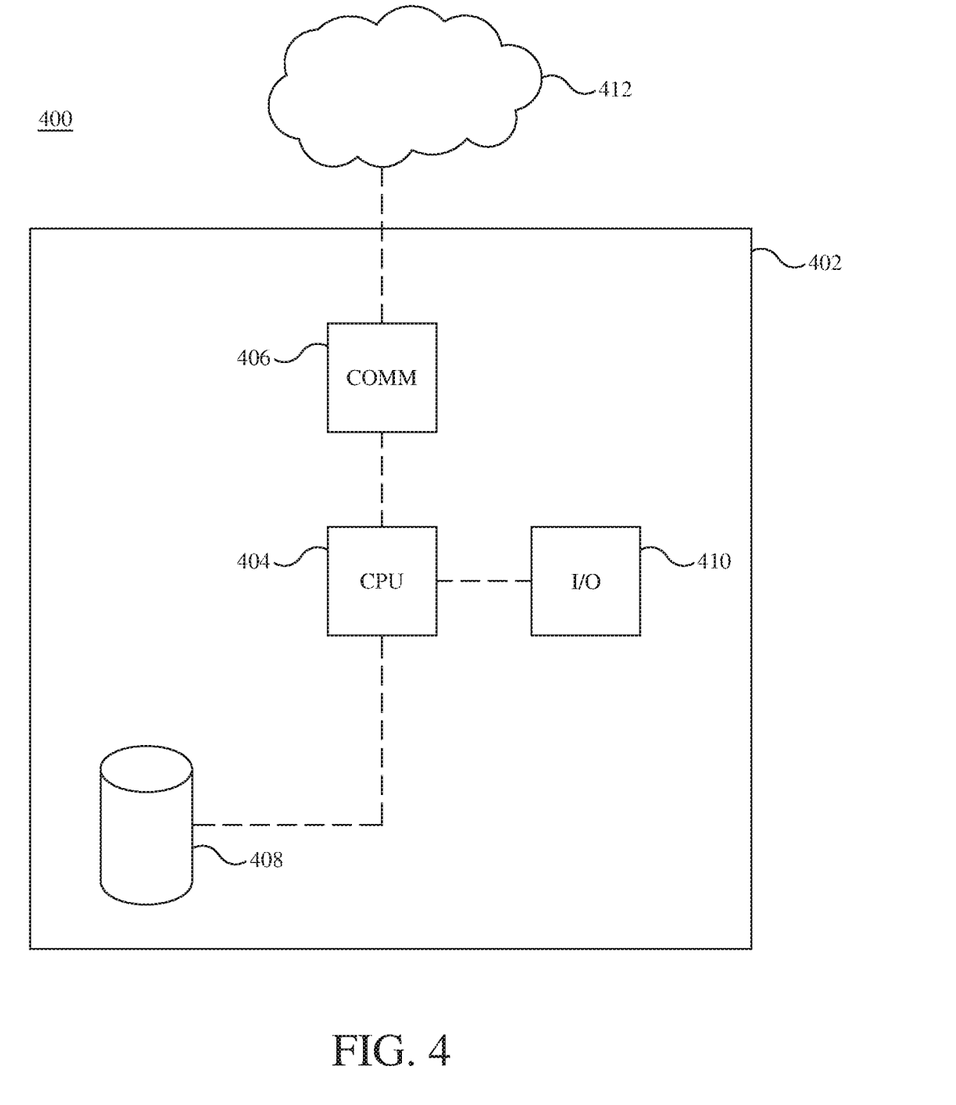
FIG. 4 illustrates an exemplary data processing device or system which can be used to implement the methods.

In one embodiment, a computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 4. The computing system 400 includes a computer or server 402 having one or more central processing units 404 in communication with a communication module 406, one or more input/output devices 410 and at least one storage device 408. All of these components are known to those of ordinary skill in the art, and this description includes all known and future variants of these types of devices. The communication module provides for communication with other computing systems, databases and data acquisition systems across one or more local or wide area networks 412. This includes both wired and wireless communication. Suitable input-output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 400 can be used to implement the methods described above associated with the processing of seismic data from a subsurface. Hardware, firmware, software or a combination thereof may be used to perform the various steps and operations described herein.

The disclosed exemplary embodiments provide a computing device, software and method for processing seismic data from a subsurface. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data from a subsurface, the method comprising:
   obtaining observed seismic data of the subsurface;
   generating a reflectivity model of the subsurface, the reflectivity model yielding modeled seismic data of the subsurface when forward modeled;
   using least squares migration over a cost function comprising a function of a matching filter containing a mapping between the observed seismic data and the modeled seismic data by iteratively updating the reflectivity model to yield an updated reflectivity model that when forward modeled yields updated modeled seismic data that match the observed seismic data; and
   using geophysical parameters from the updated reflectivity model for structural analysis of the subsurface to locate oil and gas reservoirs.

2. The method of claim 1, wherein generating the reflectivity model further comprises generating the reflectivity model comprising a stacked reverse time migration image.

3. The method of claim 1, wherein using least squares migration further comprises:
   defining the matching filter to map at least one of the observed seismic data to the modeled seismic data and the modeled seismic data to the observed seismic data; and
   defining the cost function over the reflectivity model as a function of the matching filter.

4. The method of claim 3, wherein the cost function comprises a ratio of a least squares norm of the matching filter multiplied by a temporal lag and the least squares norm of the matching filter.

5. The method of claim 3, wherein using least squares migration further comprises updating the reflectivity model to drive the matching filter to a unit spike at zero lag.

6. The method of claim 3, wherein:
   defining the matching filter comprises defining a plurality of matching filters; and
   using least squares migration further comprises updating the reflectivity model to the plurality of matching filters to yield a unitary matching filter at zero lag.

7. The method of claim 3, wherein using least squares migration further comprises maximizing the cost function or minimizing the cost function.

8. The method of claim 1, wherein the matching filter comprises a Wiener filter.

9. The method of claim 1, further comprising pre-processing at least one of the observed seismic data, the modeled seismic data and the reflectivity model, wherein pre-processing comprises at least one of scaling, filtering, noise attenuation, event selection, smoothing and re-datuming.

10. The method of claim 1, further comprising:
    encoding the observed seismic data and the modeled seismic data by convolution with a set of encoding functions; and
    altering the encoding functions for each iterative update of the reflectivity model.

11. A method for processing seismic data from a subsurface, the method comprising:
    computing a common image gather from the observed seismic data;
    estimating a velocity model of the subsurface;
    using wave equation migration velocity analysis based on a cost function comprising a function of a matching filter containing a mapping between a reference trace at a given location and a considered trace in the common image gather by iteratively updating the velocity model to yield an updated velocity model corresponding to a desired flatness in the common image gather as indicated by the cost function; and
    using geophysical parameters from the updated velocity model for structural analysis of the subsurface to locate oil and gas reservoirs.

12. The method of claim 11, wherein the reference trace comprises a stack of common image gather over a given parameter or a given trace selected from the common image gather.

13. The method of claim 11, wherein using wave equation migration velocity analysis further comprises:
    defining the matching filter to map at least one of the reference trace to the considered trace and the considered trace to the reference trace; and
    defining the cost function over the velocity model as a function of the matching filter.

14. The method of claim 13, wherein the cost function comprises a weight function over all receiver locations and all parameters used to define the common image gather and the matching filter normalized to a given exponent and summed across all depths.

15. The method of claim 13, wherein using wave equation migration velocity analysis further comprises updating the velocity model to drive the matching filter to a unit spike at zero lag.

16. The method of claim 13, wherein:
    defining the matching filter comprises defining a plurality of matching filters; and
    using wave equation migration velocity analysis further comprises updating the velocity model to the plurality of matching filters to a unitary matching filter at zero lag.

17. The method of claim 13, wherein using wave equation migration velocity analysis further comprises maximizing the cost function or minimizing the cost function.

18. The method of claim 11, wherein the matching filter comprises a Wiener filter.

19. The method of claim 11, further comprising varying the matching filter according to recording time in the observed seismic data.

20. A method for processing seismic data from a subsurface, the method comprising:

identifying two traces from observed seismic data of the subsurface;

obtaining a cross-correlation for the two traces; and using the cross-correlation to determine a time shift between the two traces by estimating a center of cross-correlation by identifying the time shift between the two traces that minimizes a weighted integral with respect to frequency of the derivative of the phase squared of the time-shifted cross-correlation, wherein the weighted integral permits calculations to be conducted entirely in a time domain, wherein the time shift between the two traces is employed in estimating static corrections, comparing a base and a repeat survey, performing a demultiplex application with data and multiple model, multi component warping, performing cable interpolation to provide a measure of cross-line slowness of events between streamers and/or full waveform inversion minimizing difference between data and models, wherein updated models enable a structural analysis of the subsurface to locate oil and gas reservoirs.

* * * * *